Patented Nov. 8, 1938

2,136,171

UNITED STATES PATENT OFFICE 2,136,171

MANUFACTURE OF HALOGEN ALKYLAMINES

Walter Maier, Jessnitz, Germany, assignor to I. G. Farbenindustrie Aktiengesellschaft, Frankfort-on-the-Main, Germany No Drawing. Application January 4, 1936, Serial No. 57,511. In Germany January 9, 1935

7 Claims. (Cl. 260—583)

This invention relates to the manufacture of halogen alkyl amines. One of its objects is to provide an improved process of manufacturing halogen alkyl amines. Further objects will be seen from the detailed specification following hereafter.

On account of the high degree of reactivity of the halogen contained in the halogen alkylamines the latter have been proposed for use in a series of processes of technical importance. The realization of these processes, however, is hindered by the fact that it has not so far been possible to produce the halogen alkylamines on a scale requisite for industrial use.

It is known that the halogen alkylamines can be made by way of the phthalimide compounds or sulphamide compounds of the corresponding alkyl halides or by splitting phenoxy compounds of hydroxyalkylamines; it is also known that halogen alkylamines can be obtained by treating hydroxyalkylamines with concentrated aqueous hydrogen halides in a sealed tube at a raised temperature. These processes, however, on the one hand on account of their inconvenience and costliness, and on the other hand on account of the difficulties presented by lack of suitable apparatus, have not emerged from the small scale production in the laboratory.

Although the action of gaseous hydrogen halide on alkoxyls which are free from nitrogen is known, it has not been found possible to transfer this type of reaction to the hydroxyalkylamines. This may be due, on the one hand, to the fact that the salts of the hydroxyalkylamines which are first formed are, even at high temperatures, crystalline substances which offer more resistance to the reaction with gaseous hydrogen halide than is presented by the liquid alkoxyls; and on the other hand to the fact that the pronounced tendency of the hydroxy-alkylamines during their treatment with gaseous hydrogen halide to form chain-like condensation products so that the reaction does not proceed in the direction of the formation of simple halogen alkylamines.

The present invention is based on the observation that hydroxyalkylamines can be converted practically quantitatively into halogen alkylamines by treating the salts of the hydroxyalkylamines with gaseous hydrogen halide at temperatures above 100° C. In this reaction it is of importance, for the production of good yields, that the water formed in the reaction should be continuously distilled off. It is also of great importance for the practicability of the process that the operation should be conducted under normal atmospheric pressure.

As parent materials for the new process hydroxyalkylamines of very different kinds may be used; the amino-group is first combined with a suitable acid, for example, with gaseous hydrogen halide, and the product is treated at a temperature above 100° C. with hydrogen halide. In the term hydroxyalkylamines there are included both the primary amines and the further substituted amines which obviously may contain several of the hydroxyalkylamines or hydroxy-groups capable of halogenation; also the N- or C- alkylated or arylated derivatives of these amines or their substitution products. As examples there may be named ethanolamine, methylethanolamine, ethylethanolamine, diethanolamine, triethanolamine, butylethanolamine, octadecylethanolamine, cyclohexylethanolamine, phenylethanolamine, phenylbutanolamine - 1,4, hydroxypropylamine - 1,2, hydroxypropylamine - 2,1, hydroxypropylamine-1,3, and dihydroxy-2-aminobutane. During the formation of the salt the temperature is preferably kept constant and as low as possible.

On account of the high degree of reactivity of the halogen alkylamines the latter are applicable as intermediate products, for example, for introducing the amino-alkyl residue into organic compounds or for producing cyclic imines.

The following examples illustrate the invention:

*Example 1.*—142 kilos of ethanolamine hydrobromide are converted into the bromethylamine hydrobromide in a vessel having a reflux condenser by introducing gaseous hydrogen bromide and gradually raising the temperature from 140–190° C. within 6 hours. The end of the reaction may be recognized, for instance, by collecting in the receiver the theoretical quantity of the water of reaction. The slightly yellow product of reaction solidifies immediately on being poured into a cooled lead-lined pan at about 170° C. to a crystalline mass of bromethylamine hydrobromide, which, for industrial use, needs no further purification.

*Example 2.*—98 kilos of ethanolamine hydrochloride are converted in manner similar to that described in Example 1 but at a temperature of 140–220° C. into the chlorethylamine hydrochloride by means of gaseous hydrogen chloride.

*Example 3.*—117 kilos of butylethanolamine are saturated with gaseous hydrogen chloride at a temperature below 80° C. until the weight is increased to 153 kilos. The temperature is then raised to 130° C. and gaseous hydrogen bromide is introduced into the mass in a rapid stream for 4 hours the temperature being gradually raised to 180° C. The still hot liquid mass can be crystallized by pouring it into 120 kilos of spirit and cooling.

*Example 4.*—Into 605 grams of N-butylethanolamine there is introduced gaseous hydrogen iodide while gradually raising the temperature to 150° C. until approximately the theoretical quantity of water of reaction has distilled. The somewhat brown mass solidifies on cooling. By recrystallization from a mixture of ethyl acetate and alcohol the pure N-butyliodethylamine hydroiodide is obtained in a yield of 1400 grams; it melts at 146° C.

*Example 5.*—2.1 kilos of diethanolamine are converted into a hydrobromide by introducing halogen bromide at a temperature below 100° C.; this product is converted into the dibromodiethylamine hydrobromide by introducing hydrogen bromide in the course of 4 hours at 170–175° C. The mass crystallizes on cooling. By pouring the melt into a mixture of 3 litres of spirit and 3 litres of ethylacetate pure crystals may be obtained, melting point 202° C.

*Example 6.*—11.1 kilos of N-methylethanolamine hydrochloride are converted into N-methylchlorethylamine hydrochloride by introducing hydrogen chloride within 3 hours at 160–180° C. whereby the weight of the mass is increased by about 1.6 kilos. Substances recrystallized from a mixture of ethylacetate and alcohol melt at 89° C.

*Example 7.*—N-phenylethanolamine is converted at 100° C. into the hydrobromide by means of gaseous hydrogen bromide; the temperature is then raised at 150–160° C. whereby the hydroxy-group is exchanged for bromine. The amino-group is eliminated only in small degree. On pouring the molten mass into spirit and cooling crystals of N-phenylbromethylamine hydrobromide are obtained.

What I claim is:

1. A process of manufacturing a halogen alkylamine which comprises treating the hydrogen halide salt of a hydroxyalkylamine with gaseous hydrogen halide at a temperature above 100° C., while distilling off the water formed during the reaction.

2. A process of manufacturing a halogen alkylamine which comprises treating the hydrogen halide salt of a compound selected from the group consisting of ethanol amine, methylethanolamine, ethylethanolamine, diethanolamine, triethanolamine, butylethanolamine, octadecylethanolamine, cyclohexylethanolamine, phenylethanolamine, phenylbutanolamine - 1,4, 2,1, hydroxypropylamine-1,3, and dihydroxy-2-hydroxypropylamine - 1,2, hydroxypropylamine-aminobutane under atmospheric pressure with gaseous hydrogen halide at a temperature above 100° C., while distilling off the water formed during the reaction.

3. A process of manufacturing a bromalkylamine which comprises treating ethanolamine hydrobromide under atmospheric pressure with gaseous hydrogen bromide at 140° C. and gradually raising the temperature to 190° C. within 6 hours while distilling off the water formed during the reaction.

4. A process of manufacturing a chloralkylamine which comprises treating N-methylethanolamine hydrochloride under atmospheric pressure with hydrogen chloride within 3 hours at 160–180° C. while distilling off the water formed during the reaction.

5. A process of manufacturing a bromalkylamine which comprises treating diethanolamine under atmospheric pressure with hydrogen bromide at a temperature below 100° C. and treating the formed hydrobromide with hydrogen bromide at 170–175° C. during 4 hours while distilling off the water formed during the reaction.

6. A process of manufacturing a halogen alkylamine which comprises treating the hydrogen halide salt of a hydroxyalkylamine under atmospheric pressure with gaseous hydrogen halide at a temperature above 100° C.

7. A process of manufacturing a halogen alkylamine which comprises treating the hydrogen halide salt of a hydroxyalkylamine under atmospheric pressure with gaseous hydrogen halide at a temperature above 100° C., while distilling off the water formed during the reaction.

WALTER MAIER.